US012656088B2

(12) United States Patent (10) Patent No.: US 12,656,088 B2
Murata (45) Date of Patent: Jun. 16, 2026

(54) GAS GENERATOR

(71) Applicant: NIPPON KAYAKU KABUSHIKI KAISHA, Tokyo (JP)

(72) Inventor: Shoma Murata, Himeji (JP)

(73) Assignee: NIPPON KAYAKU KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/117,139

(22) PCT Filed: Oct. 25, 2023

(86) PCT No.: PCT/JP2023/038493
§ 371 (c)(1),
(2) Date: Mar. 31, 2025

(87) PCT Pub. No.: WO2024/090470
PCT Pub. Date: May 2, 2024

(65) Prior Publication Data
US 2026/0104237 A1     Apr. 16, 2026

(30) Foreign Application Priority Data

Oct. 27, 2022     (JP) ................................. 2022-172340

(51) Int. Cl.
*F42B 3/04* (2006.01)
*B60R 22/195* (2006.01)
*F42B 3/103* (2006.01)
(52) U.S. Cl.
CPC ............ *F42B 3/04* (2013.01); *B60R 22/1954* (2013.01); *F42B 3/103* (2013.01)
(58) Field of Classification Search
CPC .... F42B 3/103; F42B 3/10; F42B 3/04; B60R 21/264; B60R 21/2644; B60R 22/1954
(Continued)

(56) References Cited

U.S. PATENT DOCUMENTS

2012/0118193 A1* 5/2012 Sawada ................... F42B 3/107
102/530
2013/0199400 A1* 8/2013 Matsuura ............... B21K 23/00
102/530
(Continued)

FOREIGN PATENT DOCUMENTS

JP 2007-139366 A 6/2007
JP 2008-37389 A 2/2008
(Continued)

OTHER PUBLICATIONS

International Search Report issued on Jan. 9, 2024, in PCT/JP2023/ 038493 filed on Oct. 25, 2023, therein 3 pages.

*Primary Examiner* — John Cooper
(74) *Attorney, Agent, or Firm* — Oblon, McClelland, Maier & Neustadt, L.L.P.

(57) ABSTRACT

A gas generator includes a cup where a gas generating agent is accommodated and a holder. The holder includes a first recessed portion and an annular groove provided in an end surface on a side facing the cup, a second recessed portion provided in an end surface on an opposite side, and a partition between the first and second recessed portions. A bottom surface of the first recessed portion includes a first and second bottom surface located on a side of the second recessed portion. The gas generator satisfies A<B<C, where A represents a distance from the second bottom surface to a bottom surface of the second recessed portion, B represents a distance from the first bottom surface to the bottom surface of the second recessed portion, and C represents a distance from the bottom surface of the second recessed portion to the annular groove.

5 Claims, 7 Drawing Sheets

(58) Field of Classification Search
USPC ........................................ 102/530, 531, 282
See application file for complete search history.

(56)                    References Cited

U.S. PATENT DOCUMENTS

| | | | | |
|---|---|---|---|---|
| 2013/0200601 A1* | 8/2013 | Niehaus | .................. | C06B 45/00 |
| | | | | 280/741 |
| 2013/0276662 A1* | 10/2013 | Ohsugi | .................... | C06D 5/00 |
| | | | | 102/530 |
| 2016/0052486 A1* | 2/2016 | Ohsugi | ................ | B60R 21/264 |
| | | | | 102/530 |
| 2025/0180338 A1* | 6/2025 | Murata | .................... | F42B 3/12 |

FOREIGN PATENT DOCUMENTS

| | | | |
|---|---|---|---|
| JP | 2008-138948 | A | 6/2008 |
| JP | 2011-7484 | A | 1/2011 |
| JP | 2011-25886 | A | 2/2011 |
| JP | 2012-91110 | A | 5/2012 |
| JP | 2022-36022 | A | 3/2022 |

* cited by examiner

FIG.2                                                                                    1

FIG.3
(A)
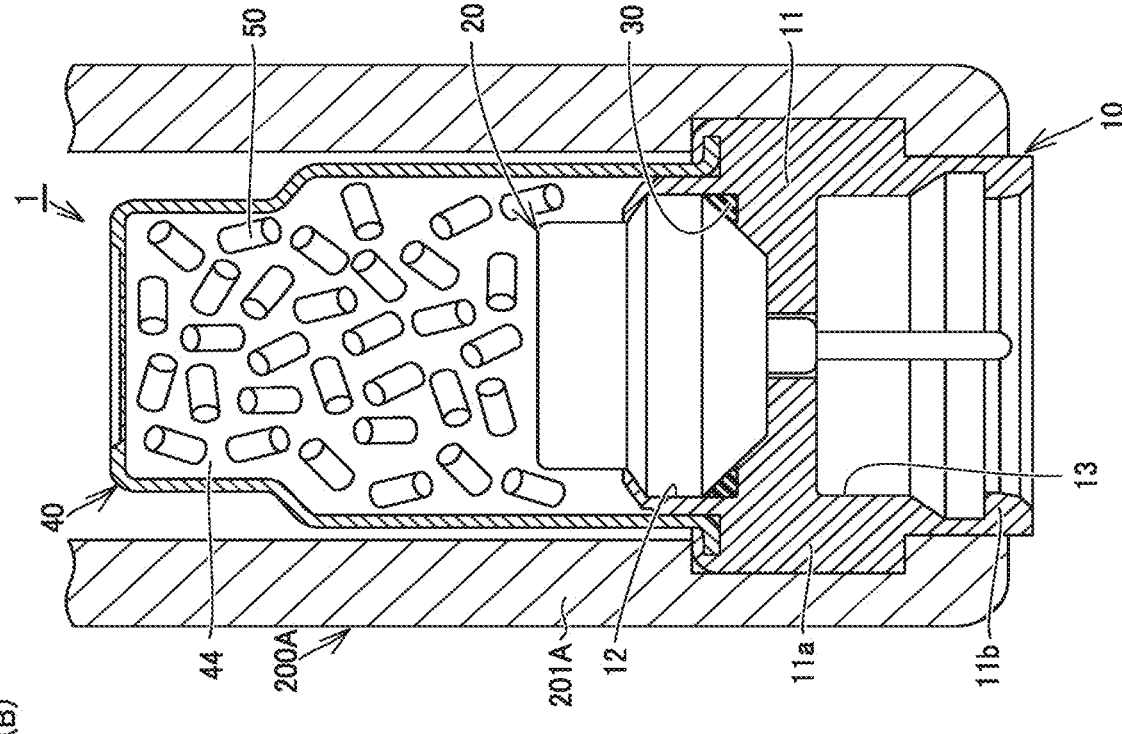
(B)
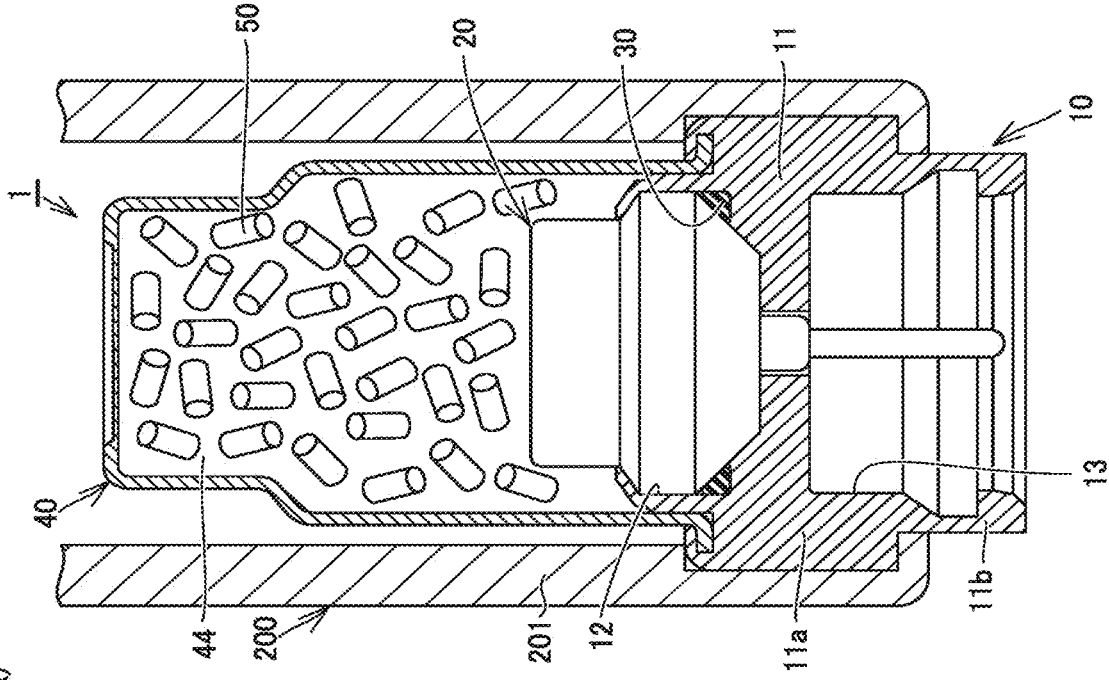

FIG.6
(A)
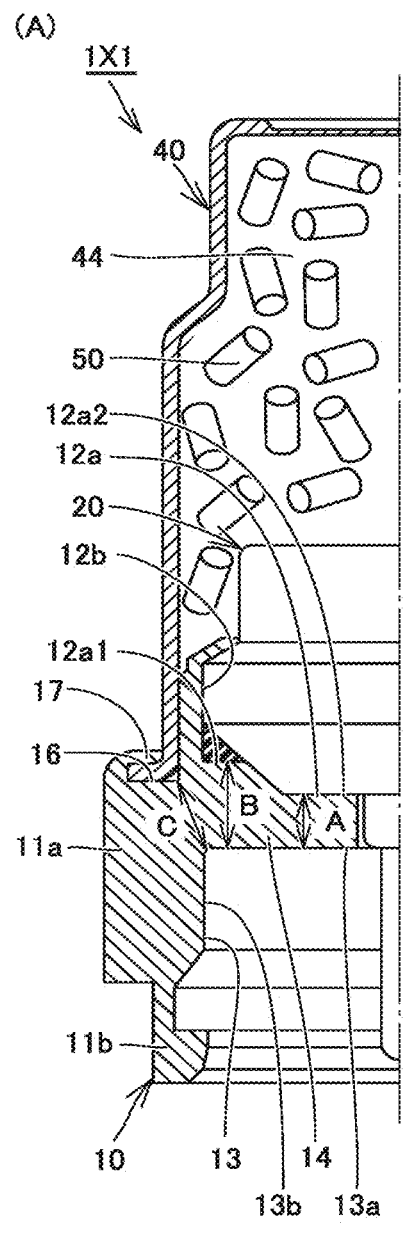
(B)
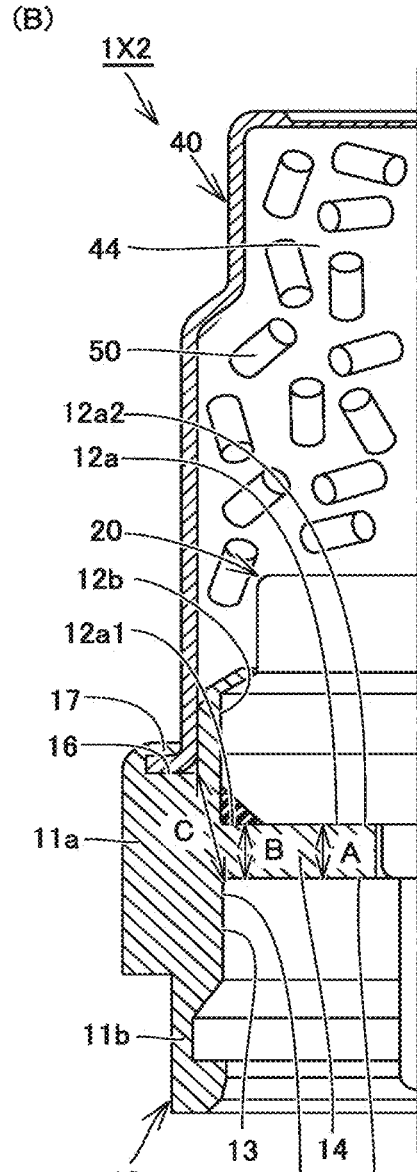

GAS GENERATOR

TECHNICAL FIELD

The present invention relates to a gas generator, and particularly to a compact gas generator constructed to generate a relatively small amount of gas at the time of activation.

BACKGROUND ART

From a point of view of protection of a driver and/or a passenger in a car or the like, a seat belt apparatus which is a passenger protection apparatus has conventionally widely been used. The seat belt apparatus is equipped for the purpose of protecting a driver and/or a passenger against shock caused at the time of collision of a vehicle or the like, and it binds the driver and/or the passenger to a seat by winding a belt around the body of the driver and/or the passenger. The driver and/or the passenger is/are thus prevented from being thrown out within the vehicle or thrown out of the vehicle at the time of collision of the vehicle or the like.

Among seat belt apparatuses, in a seat belt apparatus including what is called a pretensioner, a compact gas generator referred to as a micro gas generator is incorporated. The pretensioner is an apparatus that winds up sag of a seat belt caused by a thickness or the like of clothing, instantaneously at the time of sensing of collision of the vehicle or the like, and such a function is performed by strong draw-in of one end of the seat belt by a pressure of gas outputted from the gas generator.

This compact gas generator is extremely smaller in total amount of gas generated at the time of activation than a large-sized gas generator referred to as an inflator suitably incorporated in an air bag apparatus, and accordingly, they are greatly different from each other also in structure.

For example, Japanese Patent Laying-Open No. 2008-37389 (PTL 1) or Japanese Patent Laying-Open No. 2022-36022 (PTL 2) discloses a gas generator of this type. The gas generators disclosed in PTLs 1 and 2 each include a substantially cylindrical cup with bottom loaded with a gas generating agent that generates gas by burning, an igniter that burns the gas generating agent, and a substantially columnar holder coaxially assembled to the cup to close an open end of the cup and hold the igniter such that the igniter faces the gas generating agent.

CITATION LIST

Patent Literature

PTL 1: Japanese Patent Laying-Open No. 2008-37389
PTL 2: Japanese Patent Laying-Open No. 2022-36022

SUMMARY OF INVENTION

Technical Problem

The holder holds the igniter as described above, and is used with the cup being assembled thereto. Therefore, one axial end surface of the holder is provided with a first recessed portion where the igniter is to be received and held and an annular groove where an opening edge of the cup is to be received and held. A connector for external connection of the igniter should removably be attached to the holder. Therefore, the other axial end surface of the holder is provided with a second recessed portion where the connector is to be received and held.

The pretensioner in which the gas generator described above is incorporated has strongly been demanded to have improved mountability on the vehicle or the like. In order to achieve this improvement, reduction in size and weight of the pretensioner and reduction in size and weight of the gas generator are important issues. The holder composed of a metallic material is a component high in proportion of its weight to a total weight among components included in the gas generator. Therefore, an attempt to achieve reduction in size and weight of the gas generator has been made by modifying a material, a shape, a thickness, or the like.

The holder, however, is also a component to which a high pressure is applied at the time of activation of the gas generator. Therefore, high mechanical strength (that is, pressure resistance performance) of the holder should be secured. For example, at the time of activation of the gas generator, gas generated in the gas generator is introduced into an activation space of a pretensioner module incorporated in the seat belt apparatus. At that time, an internal pressure in the activation space becomes very high and the high pressure is applied to the holder. If the holder is insufficient in mechanical strength, the holder will be unable to withstand the high pressure and break. Consequently, leakage of gas from a broken portion disadvantageously occurs.

Thus, the gas generator described above should essentially achieve reduction in size and weight while it achieves secured high pressure resistance performance in order to realize stable operations.

Improvement in output, on the other hand, is also an important issue in the gas generator described above. In this regard, an amount of loaded gas generating agent may be increased by increasing a volume of the cup. It is not easy, however, to achieve both of improvement in output and secured pressure resistance performance and reduction in size and weight described above.

Therefore, the present invention was made to solve the problems described above, and an object thereof is to provide a gas generator that achieves high output and high pressure resistance and also further achieves reduction in size and weight.

Solution to Problem

A gas generator based on the present invention includes a gas generating agent that generates gas by burning, an igniter including an ignition portion loaded with an ignition agent and a terminal pin connected to the ignition portion, a substantially cylindrical cup with bottom where the gas generating agent is accommodated, the cup having one axial end constructed as an open end, and a substantially columnar holder that closes the open end by coaxial assembly of the cup and holds the igniter such that the ignition portion faces the gas generating agent. The holder includes a first recessed portion provided in an axial end surface on a side facing the cup, where the igniter is to be received and held, a second recessed portion provided in an axial end surface on a side not facing the cup, where the terminal pin is to be arranged and a connector for external connection of the igniter through the terminal pin is to be received and held, a partition portion that serves as a partition between the first recessed portion and the second recessed portion by defining a bottom surface of the first recessed portion and a bottom surface of the second recessed portion, and an annular groove provided in the axial end surface on the side facing the cup, where an opening edge of the cup inserted along an axial direction is to be received and held. As the bottom surface of the first recessed portion has a stepped shape, the bottom surface of the first recessed portion has an annular first bottom surface located on an outer side when viewed along an axial direction of the holder and a second bottom surface located on an inner side of the first bottom surface and located on a side of the second recessed portion relative to the first bottom surface. The gas generator based on the present invention satisfies a condition of A<B<C, where A represents a distance from the second bottom surface to the bottom surface of the second recessed portion, B represents a distance from the first bottom surface to the bottom surface of the second recessed portion, and C represents a distance from the bottom surface of the second recessed portion to the annular groove.

Advantageous Effects of Invention

According to the present invention, a gas generator that achieves high output and high pressure resistance and also achieves reduction in size and weight can be provided.

BRIEF DESCRIPTION OF DRAWINGS

FIG. 3 is a schematic cross-sectional view showing a state in which a casing of a pretensioner has been attached to the gas generator shown in FIG. 1.

FIG. 6 is a schematic cross-sectional view of a gas generator according to a comparative example.

DESCRIPTION OF EMBODIMENTS

Figure 1:
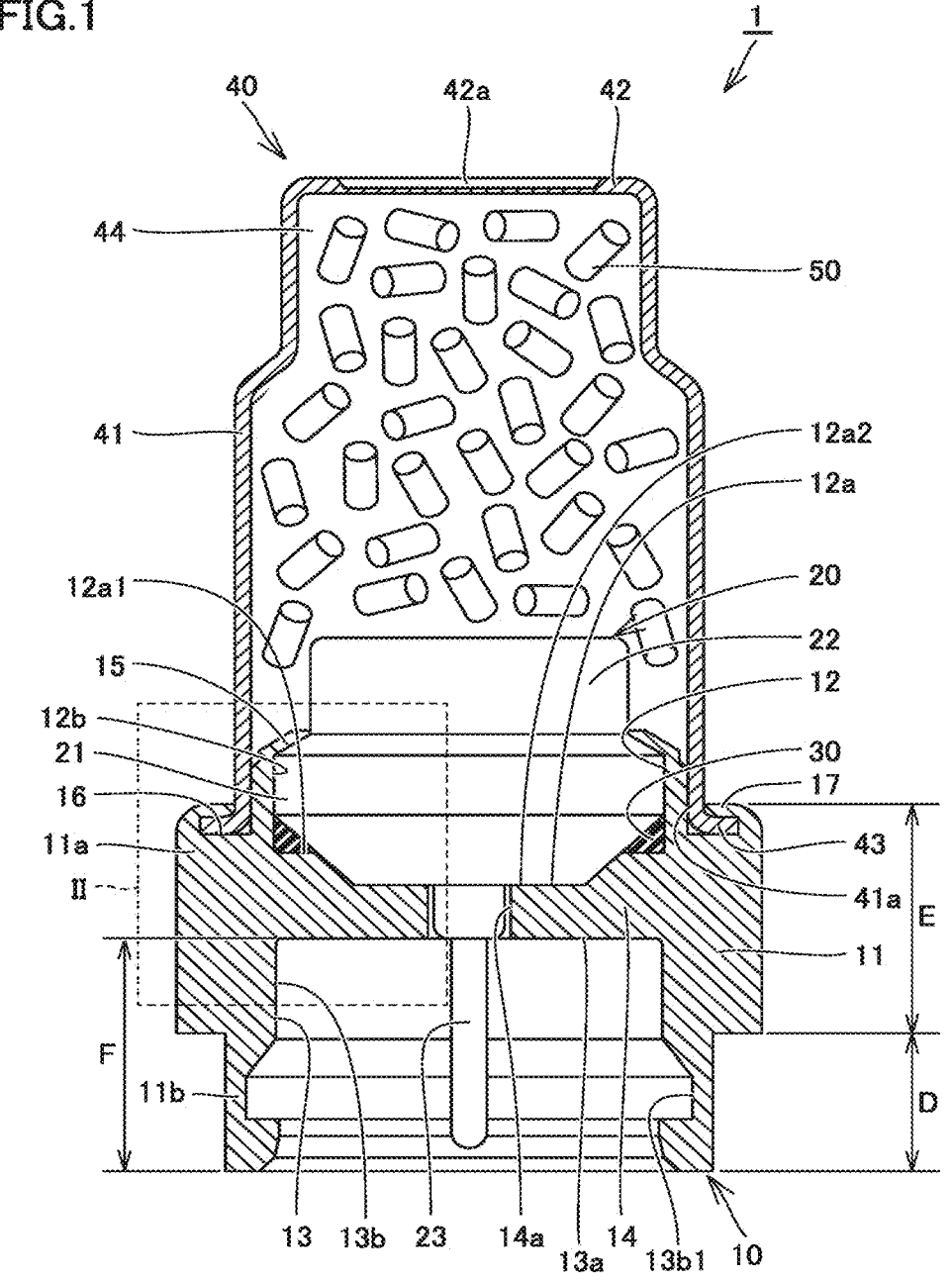
FIG. 1 is a schematic cross-sectional view of a gas generator according to an embodiment.

An embodiment of the present invention will be described hereinafter in detail with reference to the drawings. An embodiment shown below represents application of the present invention to a gas generator (what is called a micro gas generator) suitably incorporated in a seat belt apparatus including a pretensioner. The same or common elements in the embodiment shown below have the same reference characters allotted in the drawings and description thereof will not be repeated.

Embodiment

Figure 2:
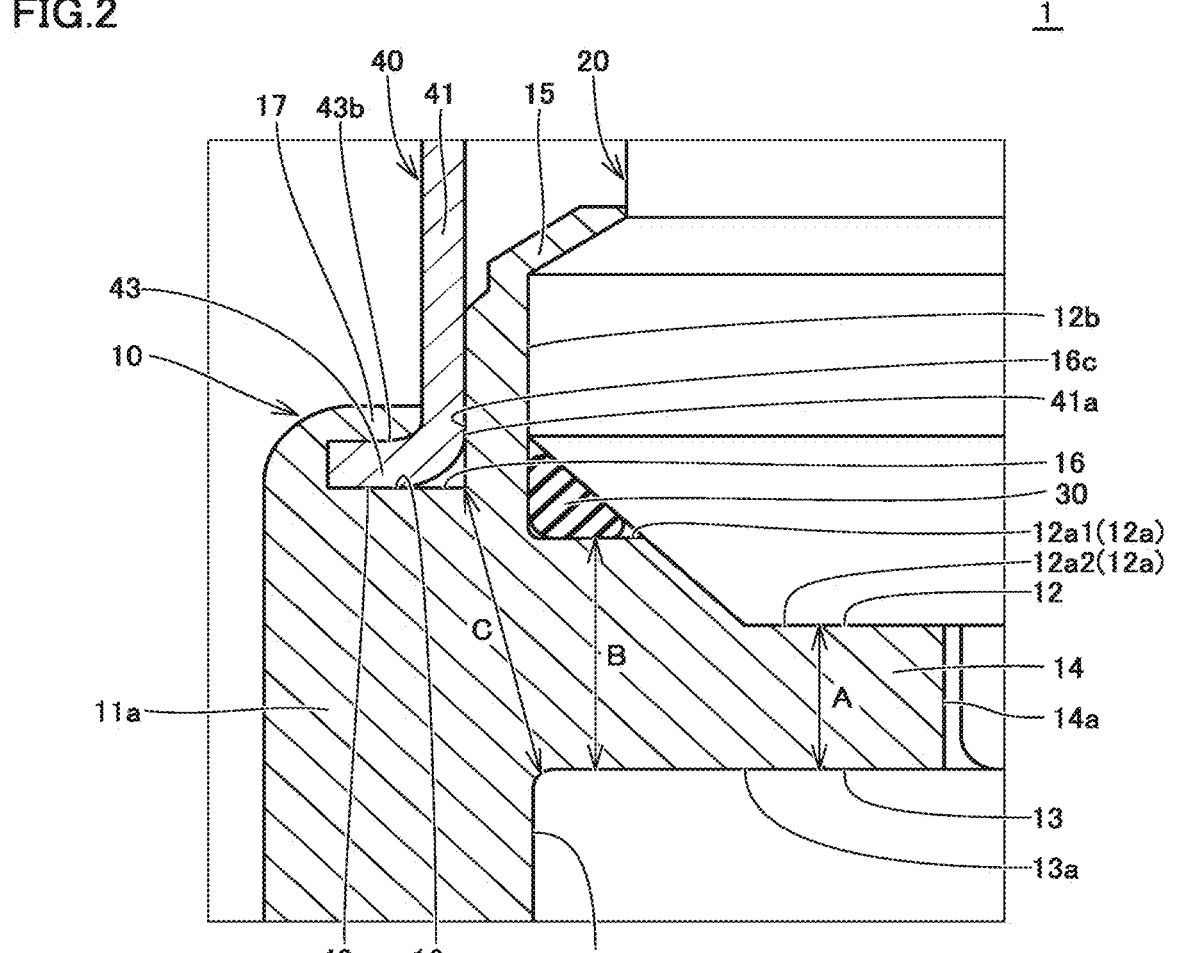
FIG. 2 is an enlarged view of an area II shown in FIG. 1.

FIG. 1 is a schematic cross-sectional view of a gas generator according to an embodiment. FIG. 2 is an enlarged view of an area II shown in FIG. 1. FIG. 3(A) is a schematic cross-sectional view showing a state in which a casing of a pretensioner has been attached to the gas generator shown in FIG. 1 and FIG. 3(B) is a schematic cross-sectional view showing another form of the pretensioner shown in FIG. 3(A). A construction of a gas generator 1 according to the present embodiment will initially be described with reference to FIGS. 1 to 3.

As shown in FIG. 1, gas generator 1 in the present embodiment mainly includes a holder 10, an igniter 20, a sealing member 30, a cup 40, and a gas generating agent 50.

By being coaxially combined, holder 10 and cup 40 constitute a housing that serves as an outer shell of gas generator 1. Igniter 20 is held by holder 10 and cup 40 is assembled to holder 10 to cover igniter 20. Gas generating agent 50 is accommodated in a space defined by holder 10, igniter 20, and cup 40.

Holder 10 is a member that holds igniter 20 and cup 40, and it is in a substantially columnar shape. In the present embodiment, holder 10 is provided with a first recessed portion 12, a second recessed portion 13, and an opening 14a which will be described later, and hence holder 10 is substantially in a substantially cylindrical shape.

Holder 10 is also a member that forms a part of the housing as described above, and it is formed, for example, of a formed article composed of a metallic material such as aluminum or an aluminum alloy. Holder 10 is formed in a shape as illustrated, by forging, punching, cutting, and the like performed in a prescribed order once or a plurality of times, for example, onto a plate-shaped metallic member or a rod-shaped metallic member provided as a source material.

Holder 10 includes a cylindrical barrel portion 11 that defines an outer circumferential surface, and barrel portion 11 is provided with first recessed portion 12 and second recessed portion 13. In a portion of barrel portion 11 located between first recessed portion 12 and second recessed portion 13, a partition portion 14 is formed to serve as a partition between first recessed portion 12 and second recessed portion 13, and a locking portion 15 is formed in a portion of barrel portion 11 located on a side of a later-described bottom wall portion 42 of cup 40 relative to partition portion 14.

Barrel portion 11 includes a first cylindrical barrel portion 11a provided at an axial end thereof on a side facing cup 40 and a cylindrical second barrel portion 11b provided at an axial end on a side not facing cup 40.

First barrel portion 11a surrounds partition portion 14, an end of first recessed portion 12 on a side of partition portion 14 in an axial direction of holder 10, and an end of second recessed portion 13 on the side of partition portion 14 in the axial direction.

Second barrel portion 11b is provided as projecting from the axial end of first barrel portion 11a on the side not facing cup 40, and it is smaller in outer geometry along a radial direction than first barrel portion 11a. Second barrel portion 11b surrounds an end of second recessed portion 13 opposite to the side of partition portion 14 in the axial direction of holder 10.

First recessed portion 12 is a part where a later-described base portion 21 of igniter 20 is to be received and held, and it is provided in an axial end surface of barrel portion 11 on the side facing cup 40. First recessed portion 12 has a bottom surface 12a defined by partition portion 14, and has an inner surface 12b mainly defined by locking portion 15.

Bottom surface 12a of first recessed portion 12 has a stepped shape. Bottom surface 12a of first recessed portion 12 thus includes an annular first bottom surface 12a1 located on an outer side in bottom surface 12a and a second bottom surface 12a2 located on an inner side of first bottom surface 12a1 and located on a side of second recessed portion 13 relatively thereto when viewed along the axial direction of holder 10.

Second recessed portion 13 is a part where a pair of later-described terminal pins 23 of igniter 20 is to be arranged and a connector (not shown) for external connection of igniter 20 through the pair of terminal pins 23 is to be received and held, and it is provided in an axial end surface of barrel portion 11 on the side not facing cup 40. Second recessed portion 13 has a bottom surface 13a defined by partition portion 14, and has an inner surface 13b defined by a cylindrical part of barrel portion 11.

Partition portion 14 is provided with opening 14a to communicate with first recessed portion 12 and second recessed portion 13. Opening 14a is a portion where the pair of terminal pins 23 is to be inserted (more strictly, a portion where the pair of terminal pins 23 and a lower end of base portion 21 of igniter 20 that covers the same are to be fitted).

Locking portion 15 is a part where base portion 21 of igniter 20 is to be fixed by swaging, and it is in an annular plate shape. Locking portion 15 has a tip end bent inward so that igniter 20 accommodated in first recessed portion 12 is immovably fixed to holder 10.

As shown in FIG. 2, the axial end surface of first barrel portion 11a on the side facing cup 40 is provided with an annular groove 16 and an annular collar portion 17 to surround locking portion 15 described above.

Annular groove 16 is a part where a later-described flange portion 43 of cup 40 inserted along the axial direction is to be received and held. Annular groove 16 is provided such that a bottom surface 16a thereof is located on a side of bottom wall portion 42 of cup 40 relative to partition portion 14.

Annular collar portion 17 is a part for fixing flange portion 43 of cup 40 by swaging, and it is in an annular plate shape provided to project from first barrel portion 11a toward an ignition portion 22 so as to define an outer wall surface of annular groove 16. Annular collar portion 17 has a portion on a tip end side thereof bent inward so that cup 40 is immovably fixed to holder 10.

As shown in FIG. 1, gas generator 1 according to the present embodiment satisfies a condition of $E<1.8\times D$, where D represents an axial length of second barrel portion 11b and E represents the sum of a length of annular collar portion 17 along the axial direction of first barrel portion 11a in a state after assembly of cup 40 to holder 10 and an axial length of first barrel portion 11a. The axial length of second barrel portion 11b can thus be relatively long.

Furthermore, a condition of $F<1.8\times D$ is satisfied, where F represents a depth of second recessed portion 13. The axial length of second barrel portion 11b can thus also be relatively long.

Igniter 20 serves to produce flames, and it is also referred to as a squib. Igniter 20 includes base portion 21, ignition portion 22, and the pair of terminal pins 23 (see FIG. 4). Base portion 21 is a part where ignition portion 22 and the pair of terminal pins 23 are held and it is also a part fixed to holder 10. Base portion 21 holds the pair of terminal pins 23 as it is inserted therein. Since the pair of terminal pins 23 is located as being superimposed in a direction orthogonal to the sheet plane in FIG. 1, only one of them is seen.

Ignition portion 22 contains an ignition agent that produces flames by being ignited to burn at the time of activation and a resistor (bridge wire) for ignition of the ignition agent. The pair of terminal pins 23 is connected to ignition portion 22 for ignition of the ignition agent.

More specifically, ignition portion 22 includes a squib cup formed like a cup. The resistor described above is attached to couple tip ends of the pair of terminal pins 23 inserted in the squib cup, and the ignition agent is loaded in the squib cup so as to surround the resistor or to be in proximity to the resistor.

Here, a Nichrome wire or the like is generally made use of as a resistor, and ZPP (zirconium potassium perchlorate), ZWPP (zirconium tungsten potassium perchlorate), lead tricinate, or the like is generally made use of as the ignition agent. The squib cup described above is generally made of metal or plastic.

Upon sensing collision, a prescribed amount of current flows in the resistor through terminal pins 23. As the prescribed amount of current flows in the resistor, Joule heat is generated in the resistor and the ignition agent starts burning. Flame at a high temperature caused by being burnt bursts the squib cup accommodating the ignition agent. A time period from flow of a current in the resistor until activation of igniter 20 is generally not longer than 2.0 milliseconds in a case that the Nichrome wire is employed as the resistor.

In assembly of igniter 20 to holder 10, igniter 20 is inserted in first recessed portion 12 from an axial end of holder 10 where first recessed portion 12 is provided such that the pair of terminal pins 23 is inserted into opening 14a provided in partition portion 14. Base portion 21 is thus accommodated in first recessed portion 12 and opening 14a and the pair of terminal pins 23 is arranged in second recessed portion 13. In this state, a portion on a tip end side of locking portion 15 is bent toward base portion 21, so that base portion 21 is sandwiched between partition portion 14 and locking portion 15 and igniter 20 is thus fixed by swaging to holder 10.

Therefore, ignition portion 22 of igniter 20 is located on the side of bottom wall portion 42 of cup 40 relative to an axial end surface of holder 10 on the side where first recessed portion 12 is provided, and ignition portion 22 faces gas generating agent 50 accommodated in an accommodation space 44 in cup 40 which will be described later.

Sealing member 30 formed from an O ring or the like is accommodated in advance in first recessed portion 12 in holder 10, and sealing member 30 seals a gap between holder 10 and igniter 20. More specifically, sealing member 30 is located as being interposed between partition portion 14 and locking portion 15 of holder 10 and base portion 21 of igniter 20, and holder 10 and igniter 20 compress sealing member 30 so that sealing member 30 secures sealing performance between them.

A member with sufficient heat resistance and durability is preferably employed as sealing member 30, and for example, an O ring or the like made of EPDM which represents one type of ethylene-propylene rubber can suitably be employed.

Cup 40 is made from a substantially cylindrical member with bottom having one axial end provided as an open end 41a, and includes a sidewall portion 41, bottom wall portion 42, and flange portion 43. Gas generating agent 50 is accommodated in accommodation space 44 in cup 40 defined by sidewall portion 41 and bottom wall portion 42.

Open end 41a described above is defined by an end of a pair of axial ends of sidewall portion 41, which is located opposite to a side where bottom wall portion 42 is located. Flange portion 43 is located to extend outward from this open end 41a. Flange portion 43 is a part for fixing cup 40 to holder 10.

As a cut like a groove is provided in a surface of bottom wall portion 42 of cup 40, bottom wall portion 42 is provided with a score 42a. This score 42a is provided to form at a prescribed position in bottom wall portion 42, a weak portion which is weaker than other positions. By providing score 42a, cup 40 starts to open from this portion at the time of activation of gas generator 1.

Cup 40 is also a member that forms a part of the housing, and it is made of a formed article composed of a metallic material such as an iron-based material containing aluminum, an aluminum alloy, and stainless steel. Press working or the like with the use of a mold is generally employed for forming cup 40.

As described above, cup 40 is assembled to holder 10 in such a manner that flange portion 43 thereof is fixed by swaging by annular collar portion 17 provided in holder 10.

More specifically, initially, flange portion 43 of cup 40 is inserted in annular groove 16 provided in holder 10. Thus, as shown in FIG. 2, a first surface 43a located on a side of holder 10, of a pair of surfaces of flange portion 43 of cup 40 located in the axial direction, abuts on bottom surface 16a of annular groove 16. At this time, an inner circumferential surface of sidewall portion 41 of cup 40 abuts on an inner wall surface 16c of annular groove 16.

The portion on the tip end side of annular collar portion 17 of holder 10 is then bent inward. Annular collar portion 17 is thus tilted in its entirety toward bottom surface 16a of annular groove 16 except for a portion on a root side thereof (that is, a portion contiguous to first barrel portion 11a), and bent toward flange portion 43 of cup 40 as described above.

Thus, as shown in FIG. 2, the portion on the tip end side of annular collar portion 17 abuts on a second surface 43b located opposite to above-described first surface 43a, of the pair of surfaces of flange portion 43 located in the axial direction. Therefore, flange portion 43 is sandwiched between the portion on the tip end side of annular collar portion 17 and bottom surface 16a of annular groove 16 in the axial direction of cup 40. Cup 40 thus has open end 41a closed by holder 10 (more strictly, igniter 20 and the like in addition thereto).

Gas generating agent 50 generates a large amount of gas by being ignited by igniter 20 to burn. A molding of smokeless powders (nitrocellulose), a molding of a non-azide-based composition composed of an organic nitrogen compound and an oxidizing agent, or the like is employed as gas generating agent 50. Use as gas generating agent 50, of a non-nitrocellulose-based gas generating agent extremely small in amount of generation of a harmful substance such as carbon monoxide has recently attracted attention.

Moldings in various shapes such as a granule, a pellet, a column, and a disc shape can be employed as the molding of gas generating agent 50. A molding with a hole (for example, a molding like a macaroni, a molding like a lotus root, or the like) with a through hole can also be employed as the molding of gas generating agent 50. An optimal shape in conformity with specifications of the pretensioner to which gas generator 1 is to be assembled is selected. A size or the like of the molding of gas generating agent 50 is selected in consideration of a linear burning velocity, a pressure index, or the like in addition to the shape. Though an amount of loaded gas generating agent 50 may be modified as appropriate in conformity with the specifications of the pretensioner to which the gas generator is to be assembled, the amount is generally set to approximately 0.1 g to 2.0 g in an example where smokeless powders are employed.

As shown in FIG. 2, in gas generator 1 according to the present embodiment, as described above, bottom surface 12a of first recessed portion 12 defined by partition portion 14 includes first bottom surface 12a1 and second bottom surface 12a2 is located on the side of second recessed portion 13 relative to first bottom surface 12a1. The gas generator is thus constructed such that a distance B from first bottom surface 12a1 of first recessed portion 12 to bottom surface 13a of second recessed portion 13 is longer than a distance A from second bottom surface 12a2 of first recessed portion 12 to bottom surface 13a of second recessed portion 13.

In gas generator 1, as described above, annular groove 16 is provided such that bottom surface 16a thereof is located on the side of bottom wall portion 42 of cup 40 relative to partition portion 14. The gas generator is thus constructed such that a distance C from bottom surface 13a of second recessed portion 13 to annular groove 16 is longer than distance B.

In other words, gas generator 1 according to the present embodiment satisfies a condition of A<B<C, where A represents the distance from second bottom surface 12a2 of first recessed portion 12 to bottom surface 13a of second recessed portion 13, B represents the distance from first bottom surface 12a1 of first recessed portion 12 to bottom surface 13a of second recessed portion 13, and C represents the distance from bottom surface 13a of second recessed portion 13 to annular groove 16.

According to such a construction, the gas generator that achieves high output and high pressure resistance and further achieves also reduction in size and weight can be obtained, which will be described later in detail.

As shown in FIG. 3(A), in incorporation of gas generator 1 in a pretensioner 200 equipped in the seat belt apparatus, a substantially cylindrical casing 201 included in pretensioner 200 is assembled to gas generator 1. More specifically, initially, casing 201 is externally attached to holder 10 to surround first barrel portion 11a from the axial end of holder 10 on the side where first recessed portion 12 is provided. A stepped portion provided on an inner circumferential surface of casing 201 thus abuts on the axial end surface of first barrel portion 11a located on the side of bottom wall portion 42 of cup 40. As a portion on a tip end side of casing 201 is bent toward second barrel portion 11b in this state, casing 201 is fixed by swaging to holder 10. Casing 201 is thus assembled to gas generator 1.

As shown in FIG. 3(B), in a pretensioner 200A according to another form of pretensioner 200 shown in FIG. 3(A), a casing 201A is constructed to be larger in thickness than casing 201 of pretensioner 200 in order to improve pressure resistance performance thereof.

As casing 201A is constructed to be larger in thickness, a position of a tip end of assembled casing 201A changes toward the axial end surface of holder 10 on the side not facing cup 40. Therefore, in an example where the axial length (a distance D in FIG. 1) of second barrel portion 11b is relatively short, the tip end of casing 201A projects on the outside of the axial end surface of holder 10, which gives rise to a problem of difficulty in attachment of the connector to second recessed portion 13.

In this regard, the axial length (distance D in FIG. 1) of second barrel portion 11b is relatively long as described above in gas generator 1 according to the present embodiment, and hence occurrence of the problem above can be prevented.

Figure 4:
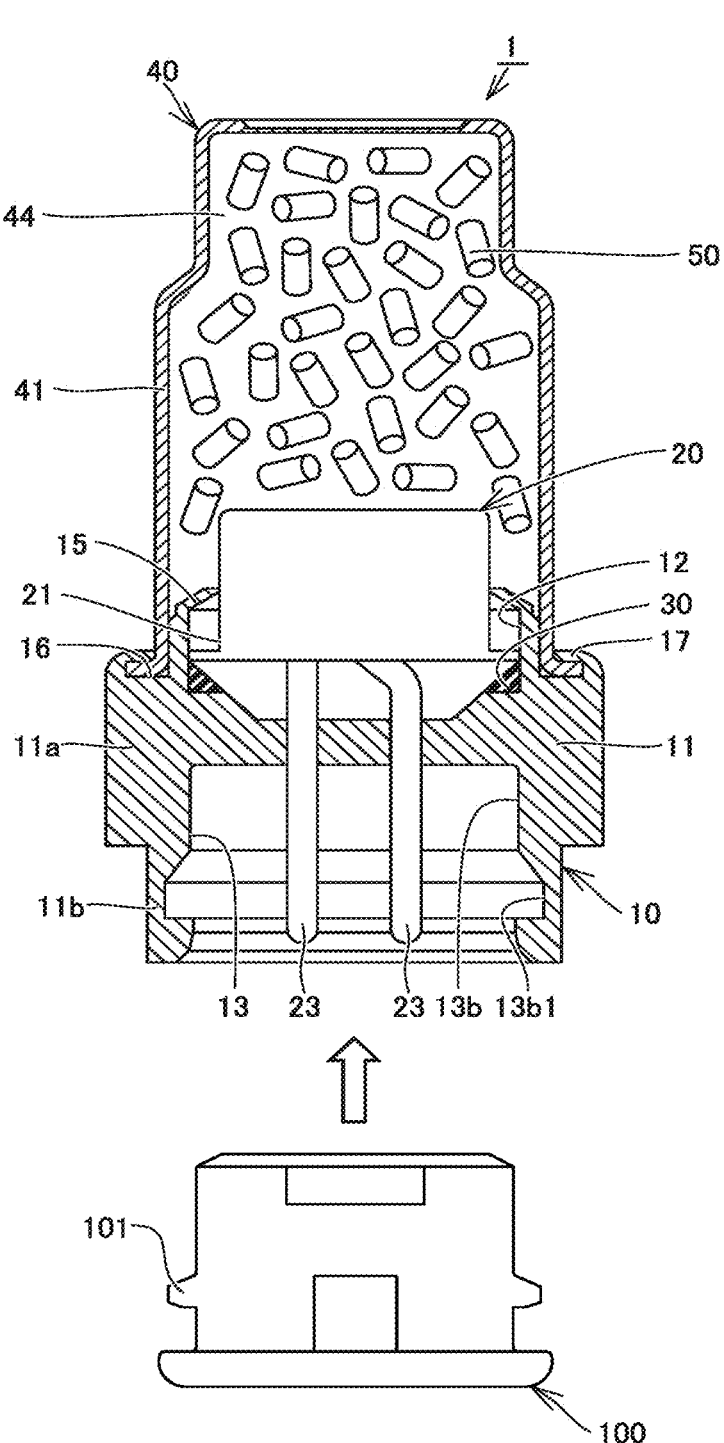
FIG. 4 is a schematic cross-sectional view showing a method of assembling a shorting clip to the gas generator shown in FIG. 1.
Figure 5:
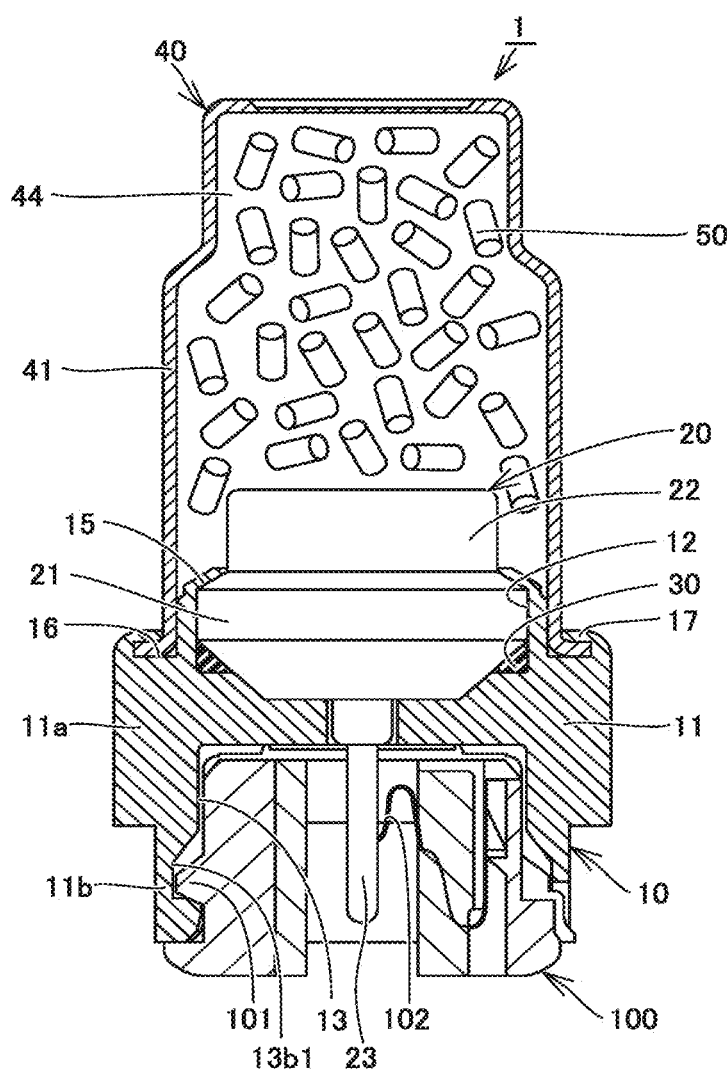
FIG. 5 is a schematic cross-sectional view showing a state in which the shorting clip has been assembled to the gas generator shown in FIG. 1.

FIG. 4 is a schematic cross-sectional view showing a method of assembling a shorting clip to the gas generator shown in FIG. 1 and FIG. 5 is a schematic cross-sectional view showing a state in which the shorting clip has been assembled to the gas generator shown in FIG. 1. A method of assembling a shorting clip 100 to gas generator 1 in the present embodiment will now be described with reference to FIGS. 4 and 5. FIG. 4 shows only shorting clip 100 in a side view. FIG. 4 shows a cross-section orthogonal to the cross-section shown in FIG. 1 when gas generator 1 is viewed in a plan view.

Shorting clip 100 is provided in gas generator 1 constructed as described above in order to prevent erroneous operation of gas generator 1 due to electrostatic discharge or the like, for example, during transport for shipment of gas generator 1 before it is mounted on a vehicle. By being assembled to gas generator 1, shorting clip 100 serves to intentionally short-circuit the pair of terminal pins 23 of igniter 20.

As shown in FIG. 4, in assembly of shorting clip 100 to gas generator 1, shorting clip 100 is inserted in second recessed portion 13 of holder 10. At this time, a plurality of tab portions 101 provided as projecting outward from a side surface of shorting clip 100 are engaged with a plurality of recesses 13b1 provided in inner surface 13b of second recessed portion 13. As a result of this engagement, shorting clip 100 is fixed to second recessed portion 13.

As shown in FIG. 5, shorting clip 100 is fixed to second recessed portion 13 so that two leaf spring portions 102 provided in shorting clip 100 are pressed against the pair of terminal pins 23, respectively. Gas generator 1 is thus maintained in a short-circuited state.

An operation at the time of activation, of gas generator 1 in the present embodiment will now be described with reference to FIG. 1.

Referring to FIG. 1, when a vehicle on which gas generator 1 in the present embodiment is mounted collides, collision sensing means separately provided in the vehicle senses collision, and based thereon, igniter 20 is activated. As a result of activation of igniter 20, the ignition agent accommodated in ignition portion 22 is ignited to burn, which results in burst of the squib cup.

Flames produced by burning of the ignition agent burst toward accommodation space 44 where gas generating agent 50 is accommodated, as a result of burst of the squib cup. Flames ignite and burn gas generating agent 50, and a large amount of gas is generated in accommodation space 44. Burning of this gas generating agent 50 abruptly increases the internal pressure in accommodation space 44. Bottom wall portion 42 of cup 40 thus starts to open from score 42a, and a large amount of generated gas is emitted to the outside of gas generator 1.

Thereafter, the large amount of gas emitted from gas generator 1 is guided to the activation space of the pretensioner in which gas generator 1 is incorporated, to drive the pretensioner so that one end of the seat belt provided in the seat belt apparatus is strongly drawn in.

As gas generator 1 is activated and the internal pressure in accommodation space 44 increases as described above, igniter 20 is pressed against partition portion 14. Large external force is thus applied to partition portion 14 and a portion of holder 10 that defines the vicinity thereof.

At that time, igniter 20 and a portion of partition portion 14 located on a radially inner side (that is, a portion of partition portion 14 that defines second bottom surface 12a2 of first recessed portion 12) are in surface contact while a relatively large area is secured, and hence generation of large stress in that portion of partition portion 14 is less likely. Igniter 20, a portion of partition portion 14 located on a radially outer side (that is, a portion of partition portion 14 that defines first bottom surface 12a1 of first recessed portion 12), and a portion of holder 10 that defines the vicinity thereof, on the other hand, are locally in contact with one another, and hence large stress is generated in that portion of holder 10.

Therefore, pressure resistance performance of holder 10 is determined not by mechanical strength of the portion of partition portion 14 located on the radially inner side described above but by mechanical strength of the portion of partition portion 14 located on the radially outer side and the portion of holder 10 that defines the vicinity thereof.

In this regard, as described above, gas generator 1 according to the present embodiment is constructed such that distance B (see FIG. 2) from first bottom surface 12a1 of first recessed portion 12 to bottom surface 13a of second recessed portion 13 is longer than distance A (see FIG. 2) from second bottom surface 12a2 of first recessed portion 12 to bottom surface 13a of second recessed portion 13. Mechanical strength of the portion of partition portion 14 located between first bottom surface 12a1 and bottom surface 13a, which is a portion where large stress is generated at the time of activation of gas generator 1 as described above, can thus be improved.

Furthermore, distance B is made longer to such an extent as sufficiently securing mechanical strength of the portion of partition portion 14 where large stress is generated at the time of activation, so that mechanical strength of partition portion 14 as a whole is ensured.

In an example where distance C (see FIG. 2) from the bottom surface of the second recessed portion to the annular groove is equal to or shorter than distance B even when the condition of A<B is satisfied as described above, on the other hand, mechanical strength of the portion of the holder located between the second recessed portion and the annular groove determines pressure resistance performance of the holder as a whole.

In this regard again, as described above, gas generator 1 according to the present embodiment is constructed such that distance C from bottom surface 13a of second recessed portion 13 to annular groove 16 is longer than distance B. Pressure resistance performance of holder 10 is thus determined by mechanical strength of the portion of partition portion 14 located between first bottom surface 12a1 and bottom surface 13a which is a portion that defines distance B. Furthermore, since mechanical strength of that portion of partition portion 14 is ensured, gas generator 1 excellent in pressure resistance performance can consequently be obtained.

When the condition of B<C is satisfied as described above, a position where second recessed portion 13 is disposed backs off in a direction away from bottom wall portion 42 of cup 40, and similarly, positions where first recessed portion 12 and partition portion 14 are disposed also back off in the direction away from bottom wall portion 42.

According to such a construction, positions where igniter 20 received and held in first recessed portion 12 and the connector received and held in second recessed portion 13 back off in the direction away from bottom wall portion 42. Therefore, the amount of loaded gas generating agent 50 can be increased with increase in volume of accommodation space 44 in cup 40 in conformity therewith, and high output of gas generator 1 can consequently be achieved.

Furthermore, when the condition of B<C is satisfied as described above, a height of cup 40 and the axial length of first barrel portion 11a do not have to particularly be modified, although the axial length (distance D in FIG. 1) of second barrel portion 11b becomes slightly longer. Therefore, gas generator 1 that achieves reduction in size and weight can be obtained.

Therefore, with gas generator 1 as in the present embodiment described above, the gas generator that achieves high output and high pressure resistance and further achieves also reduction in size and weight can be obtained.

An effect obtained by gas generator 1 according to the present embodiment described above will be described below, in comparison to gas generators according to comparative examples. FIGS. 6(A) and 6(B) are schematic cross-sectional views of gas generators 1X1 and 1X2 according to first and second comparative examples, respectively.

As shown in FIG. 6(A), gas generator 1X1 according to the first comparative example is constructed such that distance A from the second bottom surface of the first recessed portion to the bottom surface of the second recessed portion, distance B from the first bottom surface of the first recessed portion to the bottom surface of the second recessed portion, and distance C from the bottom surface of the second recessed portion to the annular groove satisfy a condition of A<C<B. In other words, gas generator 1X1 according to the first comparative example achieves improvement in mechanical strength of the portion of partition portion 14 located on the radially outer side owing to the stepped shape of bottom surface 12a of first recessed portion 12, whereas it is constructed to relatively be low in mechanical strength of the portion of holder 10 located on the radially outer side of that portion of partition portion 14.

When the condition of C<B is satisfied as described above, mechanical strength of the portion of the holder (the portion of the holder that defines distance C) located between the second recessed portion and the annular groove determines pressure resistance performance of the holder as a whole. In gas generator 1X1, however, due to relatively shorter distance C, tendency of concentration of stress at a corner portion of the second recessed portion and a corner portion of the annular groove, or the like, mechanical strength of that portion of the holder is relatively low. Consequently, it becomes difficult to secure high pressure resistance performance of the holder as a whole.

In contrast, gas generator 1 according to the present embodiment satisfies the condition of B<C as described above. Therefore, mechanical strength of the portion of partition portion 14 (that is, the portion of partition portion 14 that defines distance B) located between first bottom surface 12a1 of first recessed portion 12 and bottom surface 13a of second recessed portion 13 determines pressure resistance performance of the holder as a whole. In addition, mechanical strength of that portion of partition portion 14 is ensured. Therefore, gas generator 1 according to the present embodiment is better in pressure resistance performance than gas generator 1X1.

In addition, gas generator 1 according to the present embodiment is relatively longer in distance C than gas generator 1X1 relatively short in distance C. Therefore, with gas generator 1 according to the present embodiment, as described above, the volume of accommodation space 44 in cup 40 can be increased, and the gas generator can be higher in output than gas generator 1X1.

As shown in FIG. 6(B), gas generator 1X2 according to the second comparative example is constructed to satisfy a condition of A=B<C. Specifically, gas generator 1X2 according to the second comparative example is not improved in mechanical strength of the portion of partition portion 14 located on the radially outer side due to absence of the stepped shape of bottom surface 12a of first recessed portion 12, whereas it is constructed to relatively be high in mechanical strength of the portion of holder 10 located on the radially outer side of that portion of partition portion 14 and to be large in volume of accommodation space 44 in cup 40.

When the condition of B<C is satisfied as described above, mechanical strength of the portion of the partition portion that defines distance B determines pressure resistance performance of the holder as a whole. In gas generator 1X2, however, mechanical strength of that portion of the partition portion is low due to relatively short distance B that satisfies the condition of A=B. Consequently, it becomes difficult to secure high pressure resistance performance of the holder as a whole.

In contrast, gas generator 1 according to the present embodiment satisfies the condition of A<B as described above. Therefore, with the condition of A<B being satisfied, distance B is longer and mechanical strength of the portion of partition portion 14 that defines distance B can be ensured. Therefore, gas generator 1 is better in pressure resistance performance than gas generator 1X2.

It can thus be understood based on comparison with gas generators 1X1 and 1X2 according to the first and second comparative examples that, with gas generator 1 according to the embodiment described above, the gas generator that achieves high output and high pressure resistance and further achieves also reduction in size and weight can be obtained.

Modification

Figure 7:
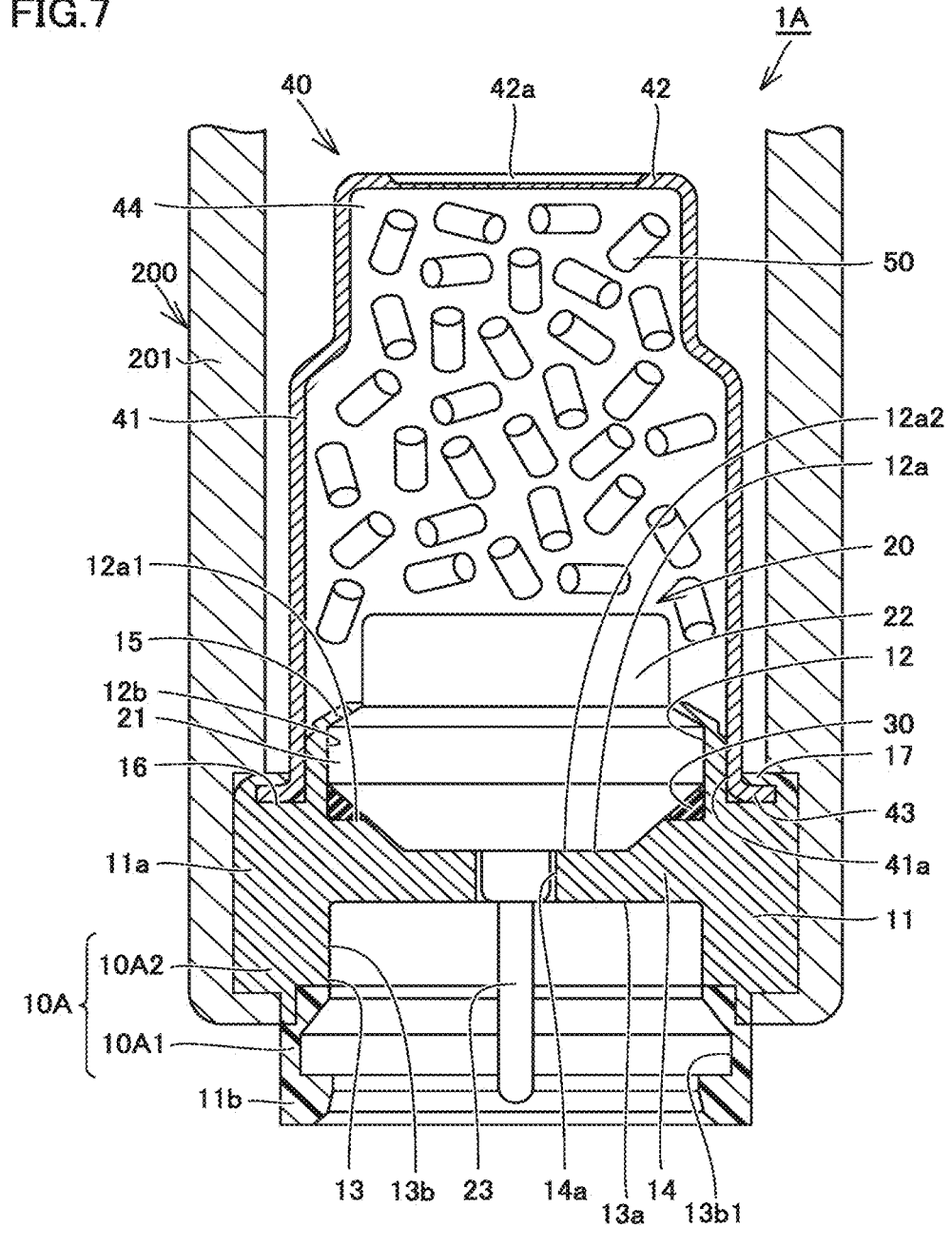
FIG. 7 is a schematic cross-sectional view showing a state in which the casing of the pretensioner has been assembled to a gas generator according to a modification.

FIG. 7 is a schematic cross-sectional view showing a state in which the casing of the pretensioner has been assembled to a gas generator according to a modification. A gas generator 1A according to the modification based on the embodiment described above will be described below with reference to FIG. 7.

As shown in FIG. 7, gas generator 1A according to the modification is different from gas generator 1 according to the embodiment described above only in construction of a holder 10A.

More specifically, holder 10A included in gas generator 1A according to the modification includes a first portion 10A1 formed from a member made of resin and a second portion 10A2 formed from a member made of metal.

First portion 10A1 defines an axial end of holder 10A not facing cup 40, the axial end including recess 13b1, and second portion 10A2 defines other portions of holder 10A. Second portion 10A2 defines an outer circumferential surface of holder 10A on a root side (that is, a side of first barrel portion 11a) of second barrel portion 11b.

First portion 10A1 is formed from a part made of resin, the part being formed by injection molding (more specifically, what is called insert molding), and integrally molded as being secured to second portion 10A2 made of metal. First portion 10A1 can be formed by using a mold in injection molding, pouring a fluid resin material into a part of a space defined by an axial end of second portion 10A2 on the side not facing cup 40 so as to fill the part of the space, and solidifying the resin material.

First portion 10A1 is not limited to a portion integrally molded with second portion 10A2 in particular by insert molding. For example, first portion 10A1 may be molded independently and thereafter press-fitted into or fitted to second portion 10A2 to thereby assembled thereto.

A resin material excellent in heat resistance, durability, corrosion resistance, or the like after it is cured is suitably selected and employed as a source material for first portion 10A1 formed by injection molding. In that case, without being limited to thermosetting resin represented by epoxy resin or the like, thermoplastic resin represented by polybutylene terephthalate resin, polyethylene terephthalate resin, polyamide resin (for example, nylon 6, nylon 66, or the like), polypropylene sulfide resin, polypropylene oxide resin, or the like can also be employed.

According to such a construction as well, an effect similar to the effect described in the embodiment described above is obtained, and the gas generator that achieves high output and high pressure resistance and further achieves also reduction in size and weight can be obtained.

According to such a construction, since a part of holder 10A is formed from the member made of resin, the gas generator that achieves reduction in cost for manufacturing the holder and reduction in weight of the holder can be obtained.

Large load is applied at the time of fixing by swaging to the outer circumferential surface of holder 10A on the root side of second barrel portion 11b which is a portion that abuts on the portion on the tip end side of casing 201 of pretensioner 200. In gas generator 1A according to the present modification, this portion is formed from second portion 10A2 made of metal. According to such a construction, holder 10A ensured in mechanical strength enough to withstand the load can be obtained.

The characteristic constructions of the gas generators disclosed in the embodiment and the modification thereof described above will be summarized as below.

Additional Aspect 1

A gas generator includes
a gas generating agent that generates gas by burning,
an igniter including an ignition portion loaded with an ignition agent and a terminal pin connected to the ignition portion,
a substantially cylindrical cup with bottom where the gas generating agent is accommodated, the cup having one axial end constructed as an open end, and
a substantially columnar holder that closes the open end by coaxial assembly of the cup and holds the igniter such that the ignition portion faces the gas generating agent,
the holder includes
    a first recessed portion provided in an axial end surface on a side facing the cup, where the igniter is to be received and held,
    a second recessed portion provided in an axial end surface on a side not facing the cup, where the terminal pin is to be arranged and a connector for external connection of the igniter through the terminal pin is to be received and held,
    a partition portion that serves as a partition between the first recessed portion and the second recessed portion by defining a bottom surface of the first recessed portion and a bottom surface of the second recessed portion, and
    an annular groove provided in the axial end surface on the side facing the cup, where an opening edge of the cup inserted along an axial direction is to be received and held,
    as the bottom surface of the first recessed portion has a stepped shape, the bottom surface of the first recessed portion has an annular first bottom surface located on an outer side when viewed along an axial direction of the holder and a second bottom surface located on an inner side of the first bottom surface and located on a side of the second recessed portion relative to the first bottom surface, and
the gas generator satisfies a condition of A<B<C, where
    A represents a distance from the second bottom surface to the bottom surface of the second recessed portion, B represents a distance from the first bottom surface to the bottom surface of the second recessed portion, and C represents a distance from the bottom surface of the second recessed portion to the annular groove.

Additional Aspect 2

In the gas generator described in Additional Aspect 1,
the cup includes a flange portion that extends outward from the open end,
the axial end surface of the holder on the side facing the cup is provided with an annular collar portion that defines an outer wall surface of the annular groove,
the flange portion includes a second surface located opposite to a first surface opposed to a bottom surface of the annular groove,
as the annular collar portion is bent inward while the flange portion is received in the annular groove, a portion on a tip end side of the annular collar portion abuts on the second surface, the flange portion is thus sandwiched between the portion on the tip end side of the annular collar portion and the bottom surface of the annular groove in an axial direction of the cup, and the cup is thus assembled to the holder,
the holder further includes
    a cylindrical first barrel portion that surrounds at least the partition portion, an end of the first recessed portion on a side of the partition portion in the axial direction of the holder, and an end of the second recessed portion on the side of the partition portion in the axial direction of the holder, and
    a cylindrical second barrel portion smaller in outer geometry than the first barrel portion, the second barrel portion being provided as projecting from an end of the first barrel portion located on a side of the axial end surface on the side of the holder not facing the cup and surrounding at least an end of the second recessed portion opposite to the side of the partition portion in the axial direction of the holder, and
the gas generator satisfies a condition of E<1.8×D, where
    D represents an axial length of the second barrel portion and E represents a sum of a length of the annular collar portion along the axial direction of the first barrel portion in a state after the cup is assembled to the holder and an axial length of the first barrel portion.

Additional Aspect 3

In the gas generator described in Additional Aspect 1 or 2,
the holder further includes
    a cylindrical first barrel portion that surrounds at least the partition portion, an end of the first recessed portion on a side of the partition portion in the axial direction of the holder, and an end of the second recessed portion on the side of the partition portion in the axial direction of the holder, and
    a cylindrical second barrel portion smaller in outer geometry than the first barrel portion, the second barrel portion being provided as projecting from an end of the first barrel portion located on a side of the axial end surface on the side of the holder not facing the cup and surrounding at least an end of the second recessed portion opposite to the side of the partition portion in the axial direction of the holder, and the gas generator satisfies a condition of F<1.8×D, where D represents an axial length of the second barrel portion and F represents a depth of the second recessed portion.

Additional Aspect 4

In the gas generator described in any one of Additional Aspects 1 to 3, an inner surface of the second recessed portion is provided with a recess for fixing a shorting clip to the second recessed portion.

Additional Aspect 5

In the gas generator described in Additional Aspect 4,
the holder further includes a cylindrical first barrel portion that surrounds at least the partition portion, an end of the first recessed portion on a side of the partition portion in the axial direction of the holder, and an end of the second recessed portion on the side of the partition portion in the axial direction of the holder, and a cylindrical second barrel portion smaller in outer geometry than the first barrel portion, the second barrel portion being provided as projecting from an end of the first barrel portion located on a side of the axial end surface on the side of the holder not facing the cup and surrounding at least an end of the second recessed portion opposite to the side of the partition portion in the axial direction of the holder, a portion of the holder that defines at least the recess is made of resin, and a portion of the holder that defines at least an outer circumferential surface on a root side of the second barrel portion is made of metal.

Other Forms Etc

The shape, the construction, the size, the number, the material, and the like of portions disclosed in the embodiment of the present invention and the modification thereof described above can variously be modified without departing from the gist of the present invention.

The characteristic constructions shown in the embodiment of the present invention and the modification thereof described above can naturally be combined with each other within the scope not departing from the gist of the present invention.

The embodiments and the modification thereof disclosed herein are thus illustrative and non-restrictive in every respect. The technical scope of the present invention is delimited by the terms of the claims and includes any modifications within the scope and meaning equivalent to the description in the terms of the claims.

REFERENCE SIGNS LIST

1, 1A, 1X1, 1X2 gas generator; 10, 10A holder; 10A1 first portion; 10A2 second portion; 11 barrel portion; 11a first barrel portion; 11b second barrel portion; 12 first recessed portion; 12a bottom surface; 12a1 first bottom surface; 12a2 second bottom surface; 12b inner surface; 13 second recessed portion; 13a bottom surface; 13b inner surface; 13b1 recess; 14 partition portion; 14a opening; 15 locking portion; 16 annular groove; 16a bottom surface; 16c inner wall surface; 17 annular collar portion; 20 igniter, 21 base portion; 22 ignition portion; 23 terminal pin; 30 sealing member, 40 cup; 41 sidewall portion; 41a open end; 42 bottom wall portion; 42a score; 43 flange portion; 43a first surface; 43b second surface; 44 accommodation space; 50 gas generating agent; 100 shorting clip; 101 tab portion; 102 leaf spring portion; 200, 200A pretensioner; 201, 201A casing.

The invention claimed is:

1. A gas generator comprising:

a gas generating agent that generates gas by burning;

an igniter including an ignition portion loaded with an ignition agent and a terminal pin connected to the ignition portion;

a substantially cylindrical cup with bottom where the gas generating agent is accommodated, the cup having one axial end constructed as an open end; and a substantially columnar holder that closes the open end by coaxial assembly of the cup and holds the igniter such that the ignition portion faces the gas generating agent, wherein the holder includes a first recessed portion provided in an axial end surface on a side facing the cup, where the igniter is to be received and held, a second recessed portion provided in an axial end surface on a side not facing the cup, where the terminal pin is to be arranged and a connector for external connection of the igniter through the terminal pin is to be received and held, a partition portion that serves as a partition between the first recessed portion and the second recessed portion by defining a bottom surface of the first recessed portion and a bottom surface of the second recessed portion, and an annular groove provided in the axial end surface on the side facing the cup, where an opening edge of the cup inserted along an axial direction is to be received and held, as the bottom surface of the first recessed portion has a stepped shape, the bottom surface of the first recessed portion has an annular first bottom surface located on an outer side when viewed along an axial direction of the holder and a second bottom surface located on an inner side of the first bottom surface and located on a side of the second recessed portion relative to the first bottom surface, and the gas generator satisfies a condition of A<B<C, where A represents a distance from the second bottom surface to the bottom surface of the second recessed portion, B represents a distance from the first bottom surface to the bottom surface of the second recessed portion, and C represents a distance from the bottom surface of the second recessed portion to the annular groove.

2. The gas generator according to claim 1, wherein the cup includes a flange portion that extends outward from the open end, the axial end surface of the holder on the side facing the cup is provided with an annular collar portion that defines an outer wall surface of the annular groove, the flange portion includes a second surface located opposite to a first surface opposed to a bottom surface of the annular groove, as the annular collar portion is bent inward while the flange portion is received in the annular groove, a portion on a tip end side of the annular collar portion abuts on the second surface, the flange portion is thus sandwiched between the portion on the tip end side of the annular collar portion and the bottom surface of the annular groove in an axial direction of the cup, and the cup is thus assembled to the holder, the holder further includes a cylindrical first barrel portion that surrounds at least the partition portion, an end of the first recessed portion on a side of the partition portion in the axial direction of the holder, and an end of the second recessed portion on the side of the partition portion in the axial direction of the holder, and a cylindrical second barrel portion smaller in outer geometry than the first barrel portion, the second barrel portion being provided as projecting from an end of the first barrel portion located on a side of the axial end surface on the side of the holder not facing the cup and surrounding at least an end of the second recessed portion opposite to the side of the partition portion in the axial direction of the holder, and the gas generator satisfies a condition of E<1.8×D, where D represents an axial length of the second barrel portion and E represents a sum of a length of the annular collar portion along the axial direction of the first barrel portion in a state after the cup is assembled to the holder and an axial length of the first barrel portion.

3. The gas generator according to claim 1, wherein the holder further includes a cylindrical first barrel portion that surrounds at least the partition portion, an end of the first recessed portion on a side of the partition portion in the axial direction of the holder, and an end of the second recessed portion on the side of the partition portion in the axial direction of the holder, and a cylindrical second barrel portion smaller in outer geometry than the first barrel portion, the second barrel portion being provided as projecting from an end of the first barrel portion located on a side of the axial end surface on the side of the holder not facing the cup and surrounding at least an end of the second recessed portion opposite to the side of the partition portion in the axial direction of the holder, and the gas generator satisfies a condition of F<1.8×D, where D represents an axial length of the second barrel portion and F represents a depth of the second recessed portion.

4. The gas generator according to claim 1, wherein an inner surface of the second recessed portion is provided with a recess for fixing a shorting clip to the second recessed portion.

5. The gas generator according to claim 4, wherein the holder further includes a cylindrical first barrel portion that surrounds at least the partition portion, an end of the first recessed portion on a side of the partition portion in the axial direction of the holder, and an end of the second recessed portion on the side of the partition portion in the axial direction of the holder, and a cylindrical second barrel portion smaller in outer geometry than the first barrel portion, the second barrel portion being provided as projecting from an end of the first barrel portion located on a side of the axial end surface on the side of the holder not facing the cup and surrounding at least an end of the second recessed portion opposite to the side of the partition portion in the axial direction of the holder, a portion of the holder that defines at least the recess is made of resin, and a portion of the holder that defines at least an outer circumferential surface on a root side of the second barrel portion is made of metal.

*   *   *   *   *